United States Patent
Yu et al.

(10) Patent No.: US 10,825,602 B2
(45) Date of Patent: Nov. 3, 2020

(54) STACKED COIL FOR WIRELESS CHARGING STRUCTURE ON INFO PACKAGE

(71) Applicant: Taiwan Semiconductor Manufacturing Company, Ltd., Hsinchu (TW)

(72) Inventors: Chen-Hua Yu, Hsinchu (TW); Tzu-Chun Tang, Kaohsiung (TW); Chuei-Tang Wang, Taichung (TW); Hao-Yi Tsai, Hsinchu (TW); Ming Hung Tseng, Toufen Township (TW); Chieh-Yen Chen, Taipei (TW); Hung-Yi Kuo, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 16/694,467

(22) Filed: Nov. 25, 2019

(65) Prior Publication Data
US 2020/0090855 A1 Mar. 19, 2020

Related U.S. Application Data

(60) Continuation-in-part of application No. 16/422,430, filed on May 24, 2019, now Pat. No. 10,510,478,
(Continued)

(51) Int. Cl.
*H01F 27/28* (2006.01)
*H01F 38/14* (2006.01)
(Continued)

(52) U.S. Cl.
CPC ........... *H01F 27/2804* (2013.01); *H01F 5/00* (2013.01); *H01F 27/28* (2013.01); *H01F 27/327* (2013.01);
(Continued)

(58) Field of Classification Search
CPC .................................. H01F 27/00–40
(Continued)

(56) References Cited

U.S. PATENT DOCUMENTS 6,871,391 B2 * 3/2005 Tokuda ............... H01F 17/0013
156/89.11
6,909,350 B2 * 6/2005 Uriu ..................... H01F 17/0013
336/200
(Continued)

FOREIGN PATENT DOCUMENTS

CN 1361550 A 7/2002
JP S62118505 A 5/1987
(Continued)

*Primary Examiner* — Tuyen T Nguyen
(74) *Attorney, Agent, or Firm* — Slater Matsil, LLP

(57) ABSTRACT

A structure includes a first encapsulating layer, and a first coil in the first encapsulating layer. A top surface of the first encapsulating layer is coplanar with a top surface of the first coil, and a bottom surface of the first encapsulating layer is coplanar with a bottom surface of the first coil. A second encapsulating layer is over the first encapsulating layer. A conductive via is in the second encapsulating layer, and the first conductive via is electrically coupled to the first coil. A third encapsulating layer is over the second encapsulating layer. A second coil is in the third encapsulating layer. A top surface of the third encapsulating layer is coplanar with a top surface of the second coil, and a bottom surface of the third encapsulating layer is coplanar with a bottom surface of the second coil.

20 Claims, 28 Drawing Sheets

Related U.S. Application Data which is a continuation of application No. 16/203,945, filed on Nov. 29, 2018, now Pat. No. 10,304,614, which is a division of application No. 15/254,761, filed on Sep. 1, 2016, now Pat. No. 10,269,481.

(60) Provisional application No. 62/342,320, filed on May 27, 2016.

(51) Int. Cl.
| | |
|---|---|
| *H02J 7/00* | (2006.01) |
| *H02J 50/10* | (2016.01) |
| *H01F 27/32* | (2006.01) |
| *H01F 41/04* | (2006.01) |
| *H01F 41/12* | (2006.01) |
| *H02J 7/02* | (2016.01) |
| *H01F 5/00* | (2006.01) |

(52) U.S. Cl.
CPC ........... *H01F 38/14* (2013.01); *H01F 41/041* (2013.01); *H01F 41/127* (2013.01); *H02J 7/0042* (2013.01); *H02J 7/025* (2013.01); *H02J 50/10* (2016.02); *H01F 2027/2809* (2013.01)

(58) Field of Classification Search
USPC ............... 336/65, 83, 90, 96, 200, 206–208, 336/232–234
See application file for complete search history.

(56) References Cited

U.S. PATENT DOCUMENTS

| | | | |
|---|---|---|---|
| 8,361,842 B2 | 1/2013 | Yu et al. |
| 8,680,647 B2 | 3/2014 | Yu et al. |
| 8,703,542 B2 | 4/2014 | Lin et al. |
| 8,759,964 B2 | 6/2014 | Pu et al. |
| 8,778,738 B1 | 7/2014 | Lin et al. |
| 8,785,299 B2 | 7/2014 | Mao et al. |
| 8,803,306 B1 | 8/2014 | Yu et al. |
| 8,809,996 B2 | 8/2014 | Chen et al. |
| 8,829,676 B2 | 9/2014 | Yu et al. |
| 8,877,554 B2 | 11/2014 | Tsai et al. |
| 8,912,666 B2 | 12/2014 | Lee et al. |
| 9,009,951 B2 | 4/2015 | Chang et al. |
| 9,460,987 B2 | 10/2016 | Hung et al. |
| 10,074,618 B1 | 9/2018 | Chen et al. |
| 10,083,912 B2 | 9/2018 | Gong et al. |
| 2002/0158306 A1 | 10/2002 | Niitsu |
| 2006/0241354 A1 | 10/2006 | Allen |
| 2010/0045419 A1 | 2/2010 | Tanabe |
| 2011/0291288 A1 | 12/2011 | Wu et al. |
| 2013/0026468 A1 | 1/2013 | Yoshimuta et al. |
| 2013/0062760 A1 | 3/2013 | Hung et al. |
| 2013/0062761 A1 | 3/2013 | Lin et al. |
| 2013/0168848 A1 | 7/2013 | Lin et al. |
| 2013/0307140 A1 | 11/2013 | Huang et al. |
| 2014/0203429 A1 | 7/2014 | Yu et al. |
| 2014/0225222 A1 | 8/2014 | Yu et al. |
| 2014/0252646 A1 | 9/2014 | Hung et al. |
| 2014/0264930 A1 | 9/2014 | Yu et al. |

FOREIGN PATENT DOCUMENTS

| | | |
|---|---|---|
| JP | 20070258521 A | 10/2007 |
| JP | 2008098423 A | 4/2008 |
| JP | 2008147537 A | 6/2008 |
| JP | 2016006816 A | 1/2016 |

\* cited by examiner

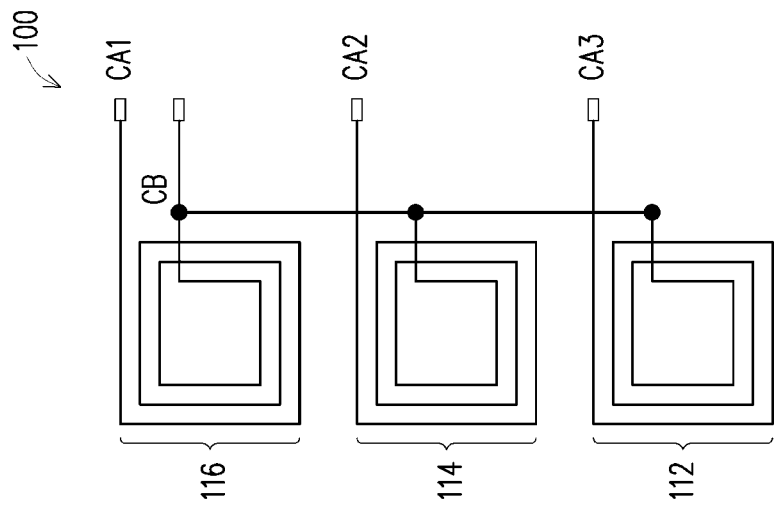
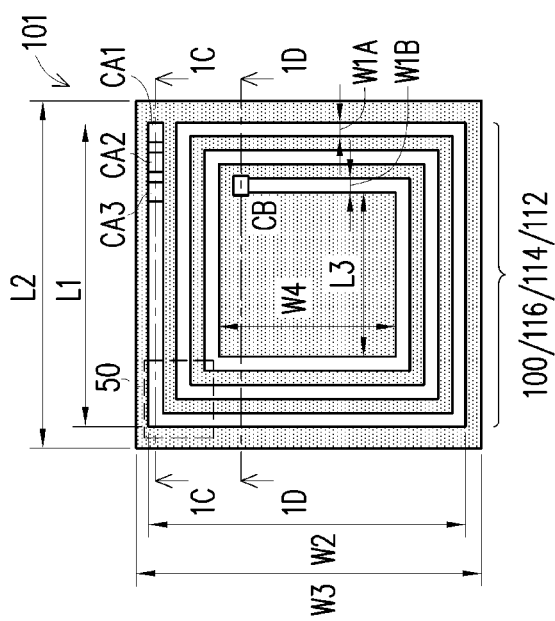
FIG. 1B
FIG. 1A

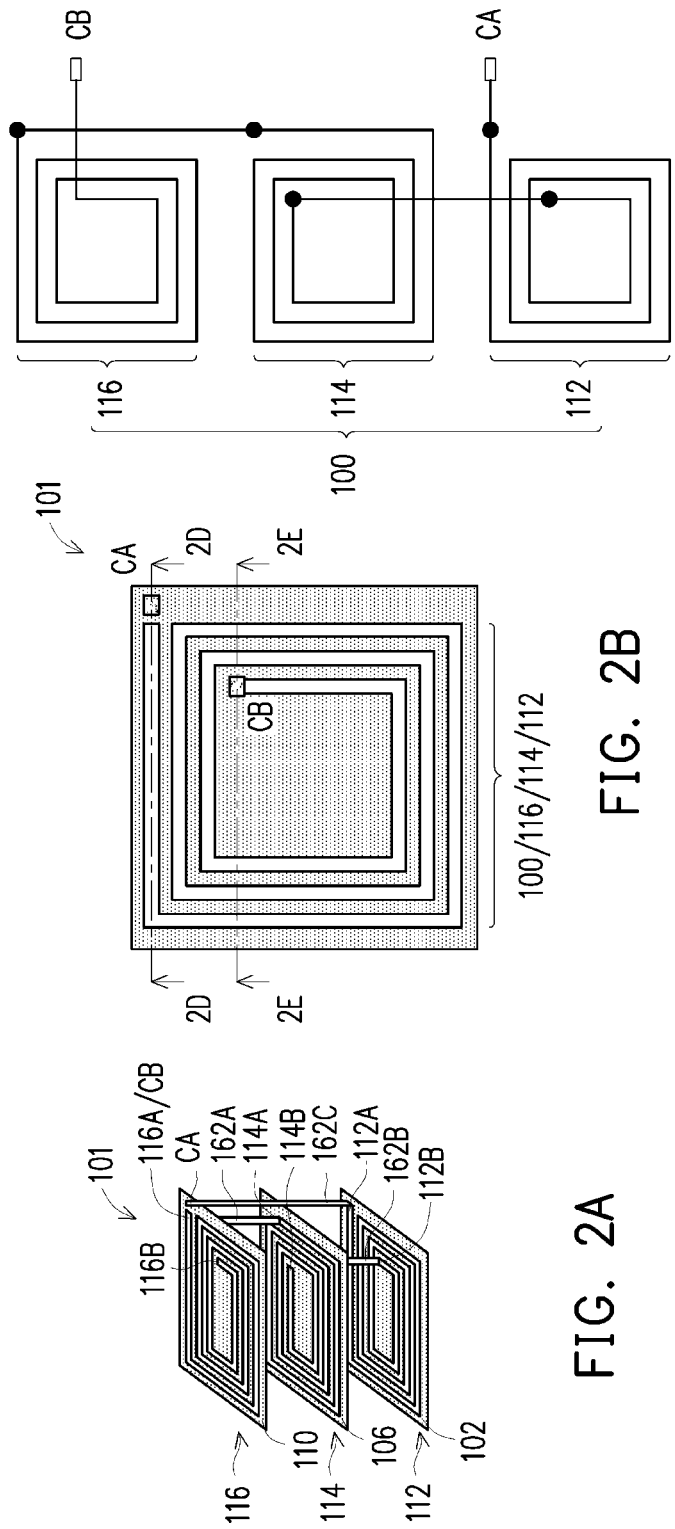

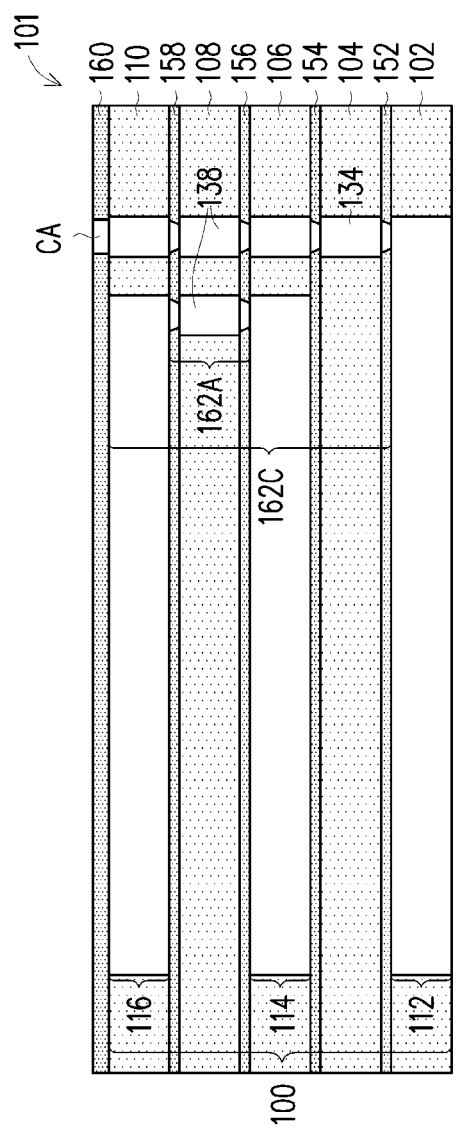
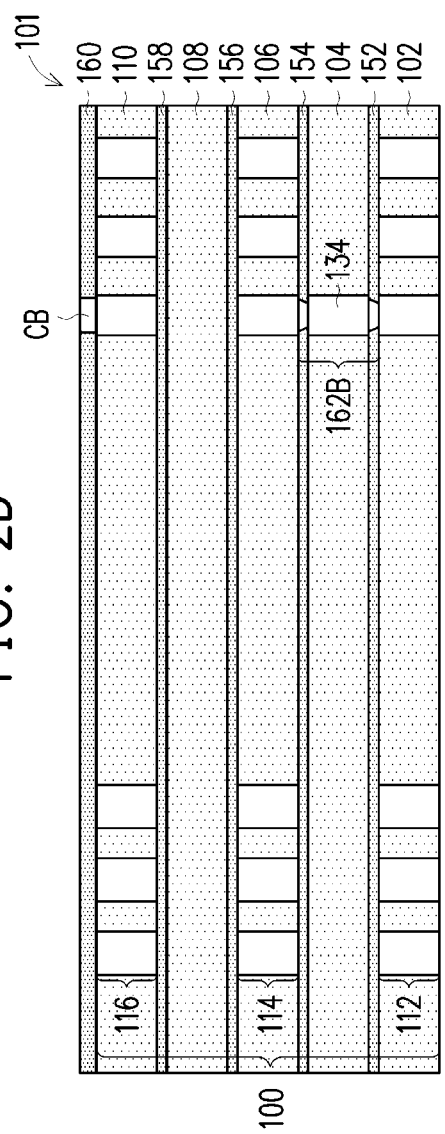
FIG. 2D
FIG. 2E

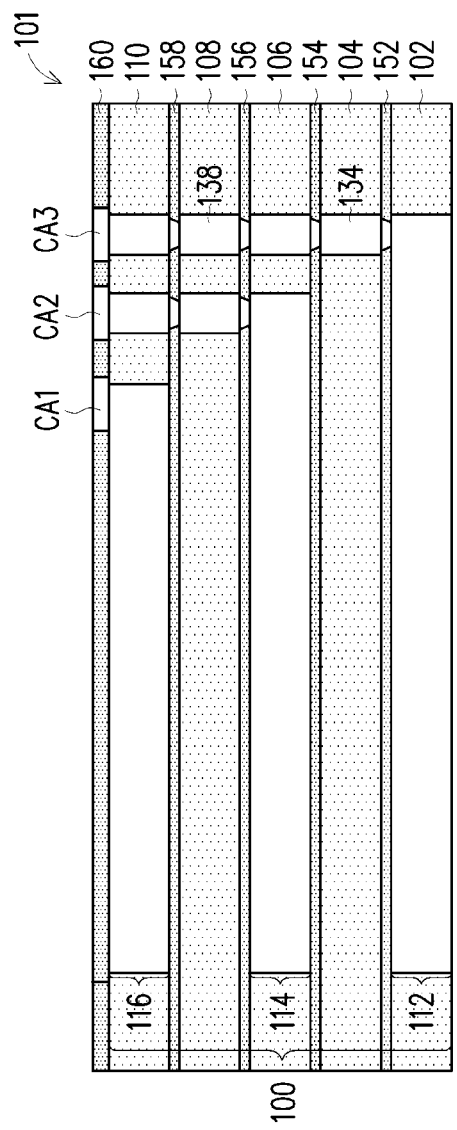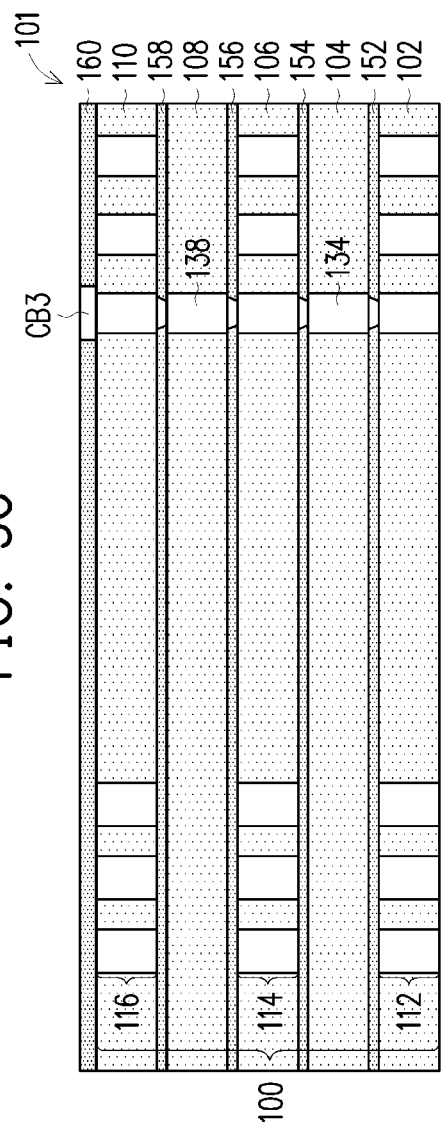

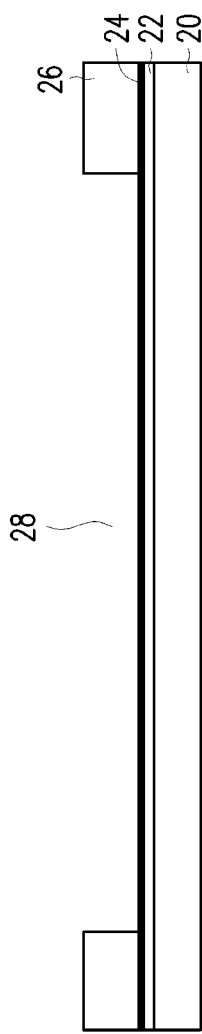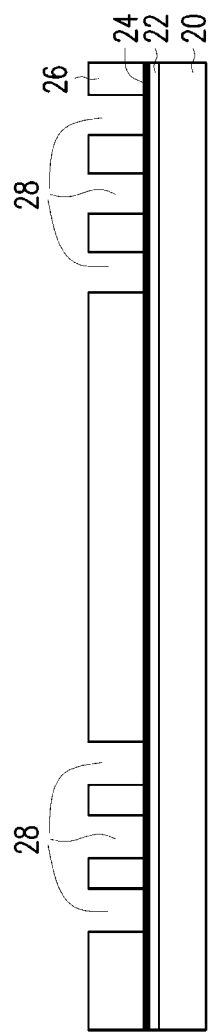

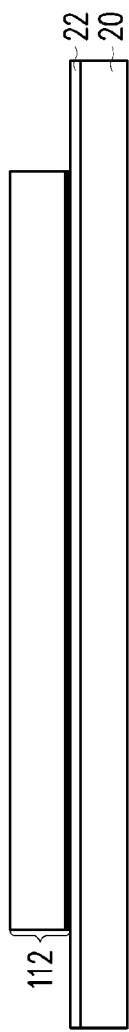
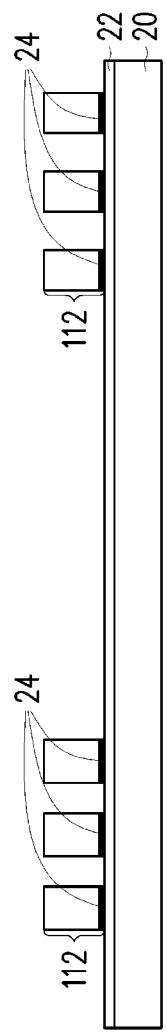
FIG. 5A
FIG. 5B

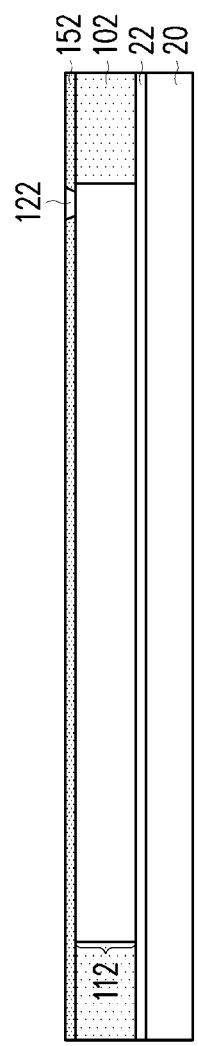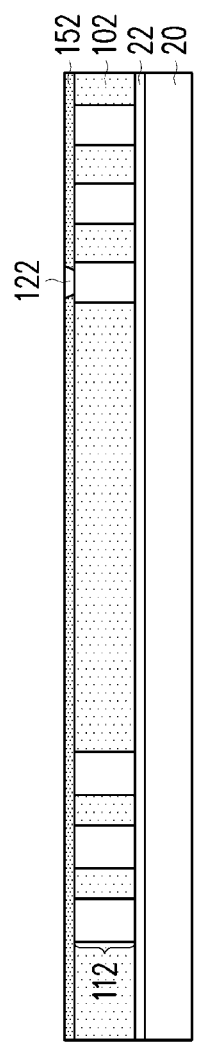

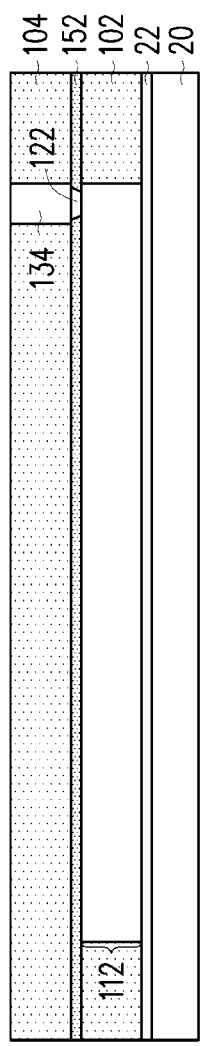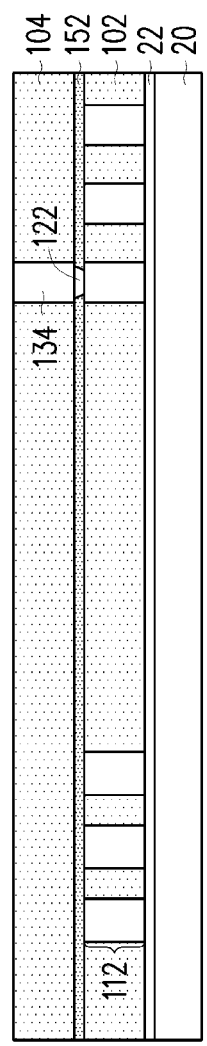
FIG. 10A
FIG. 10B

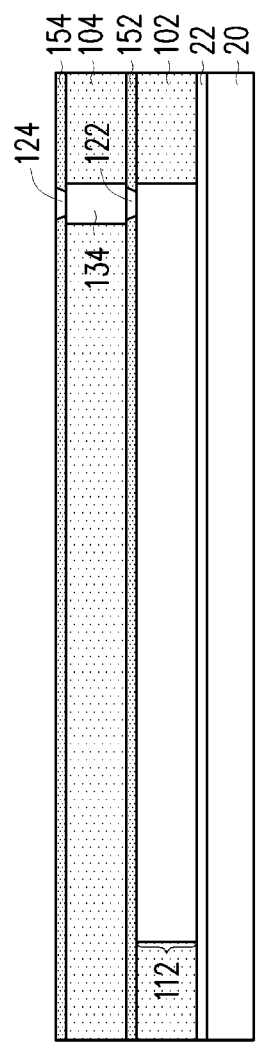
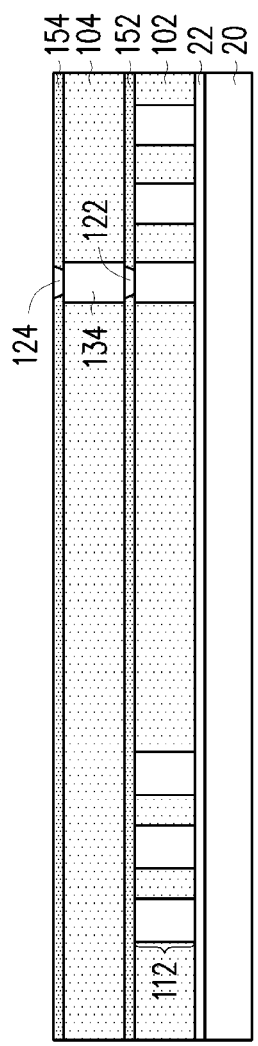
FIG. 11A
FIG. 11B

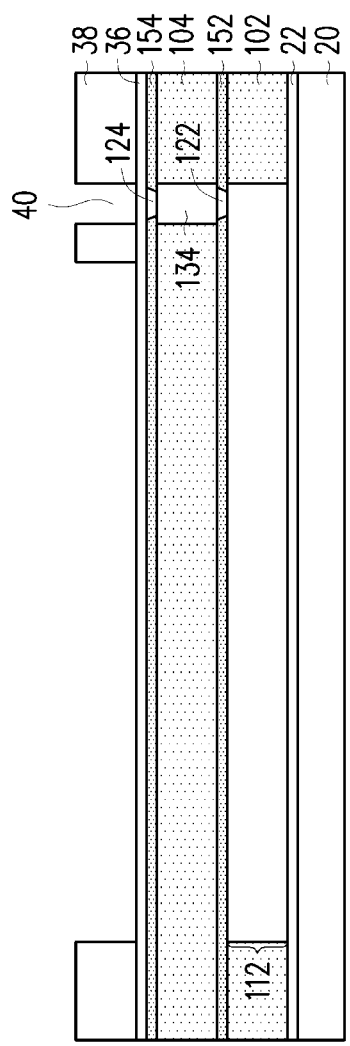
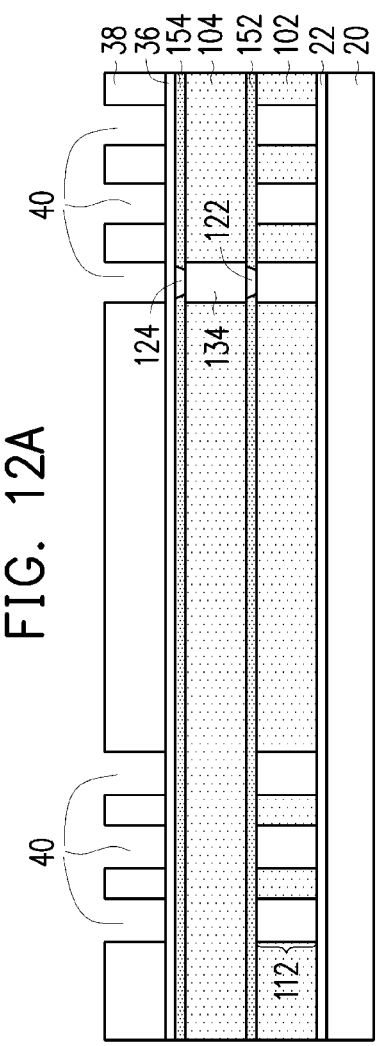
FIG. 12A
FIG. 12B

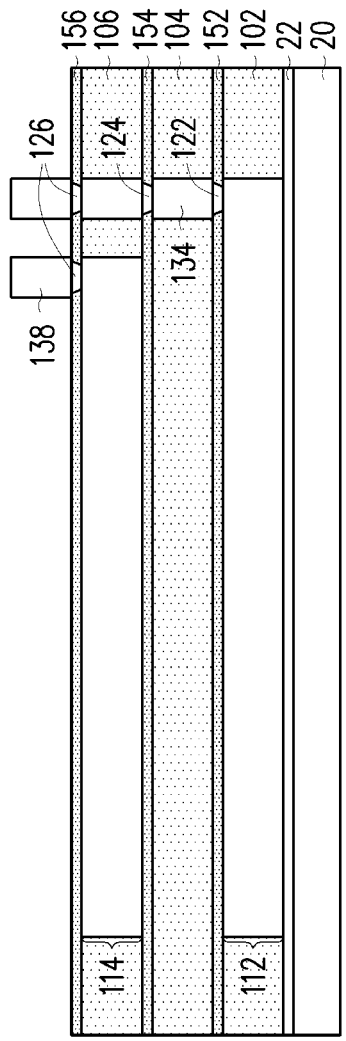
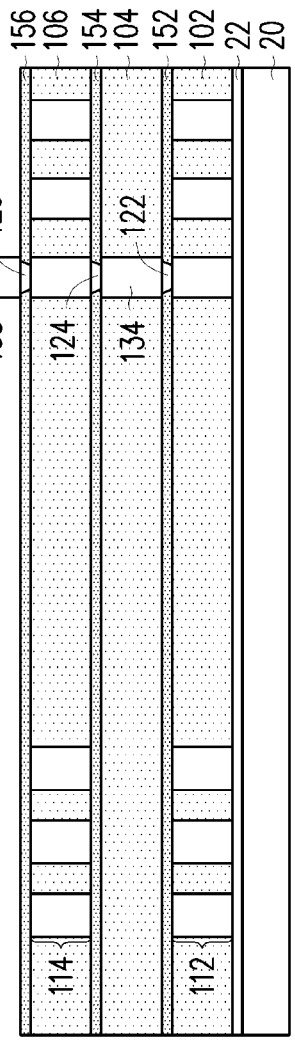
FIG. 15A
FIG. 15B

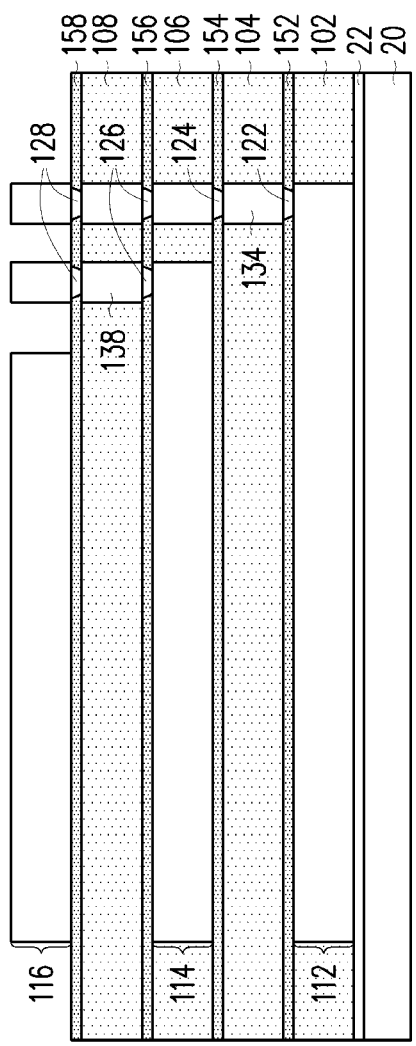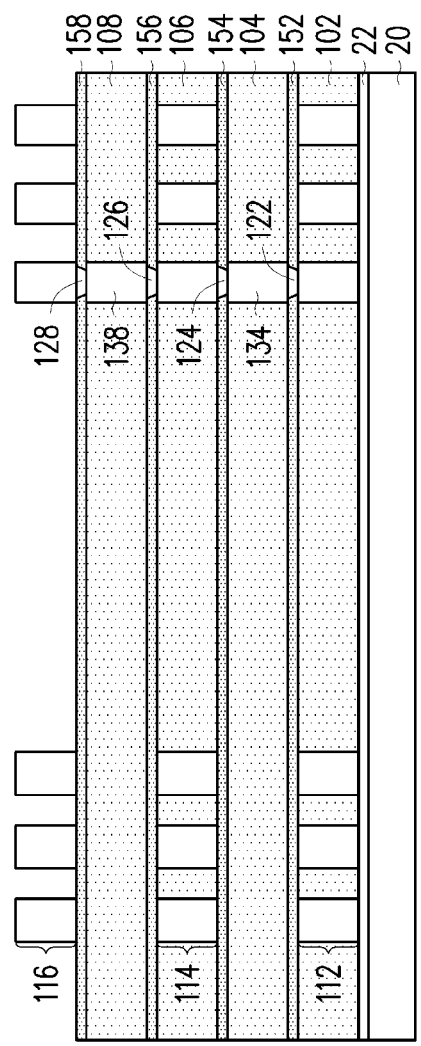

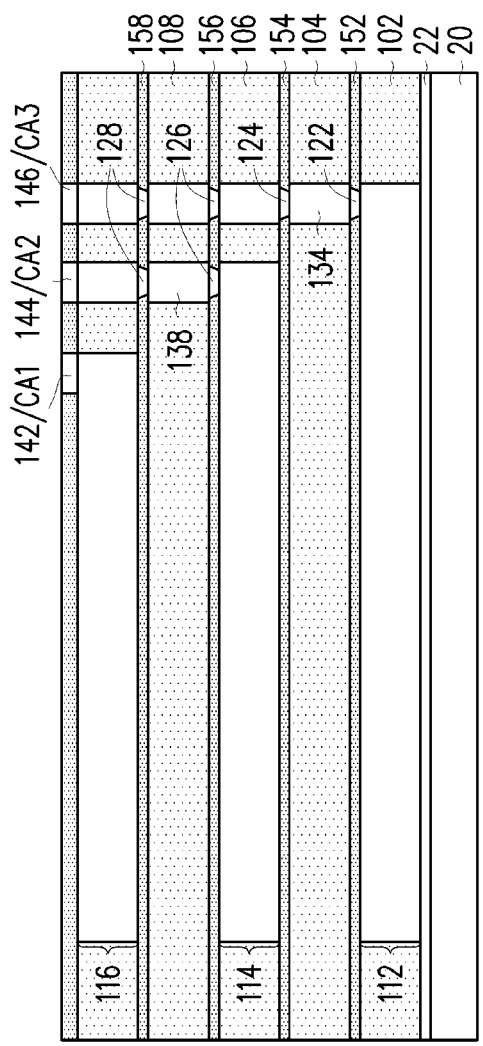
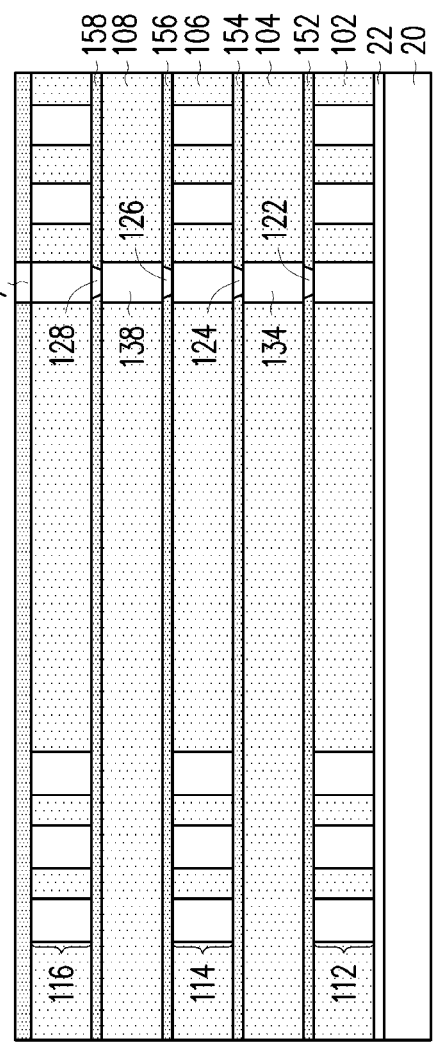
FIG. 18A
FIG. 18B

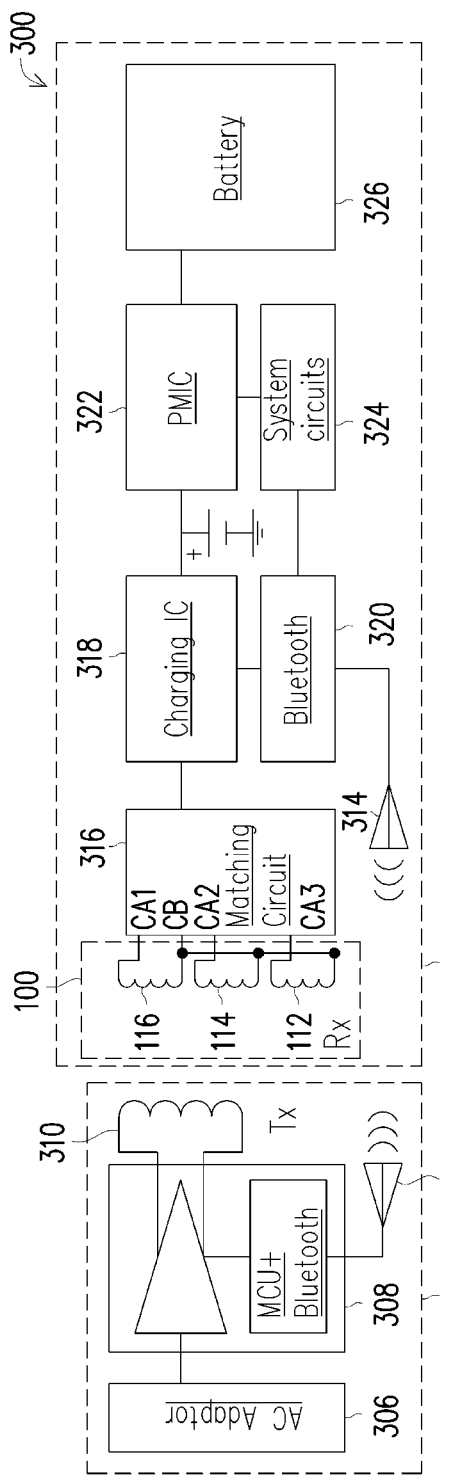
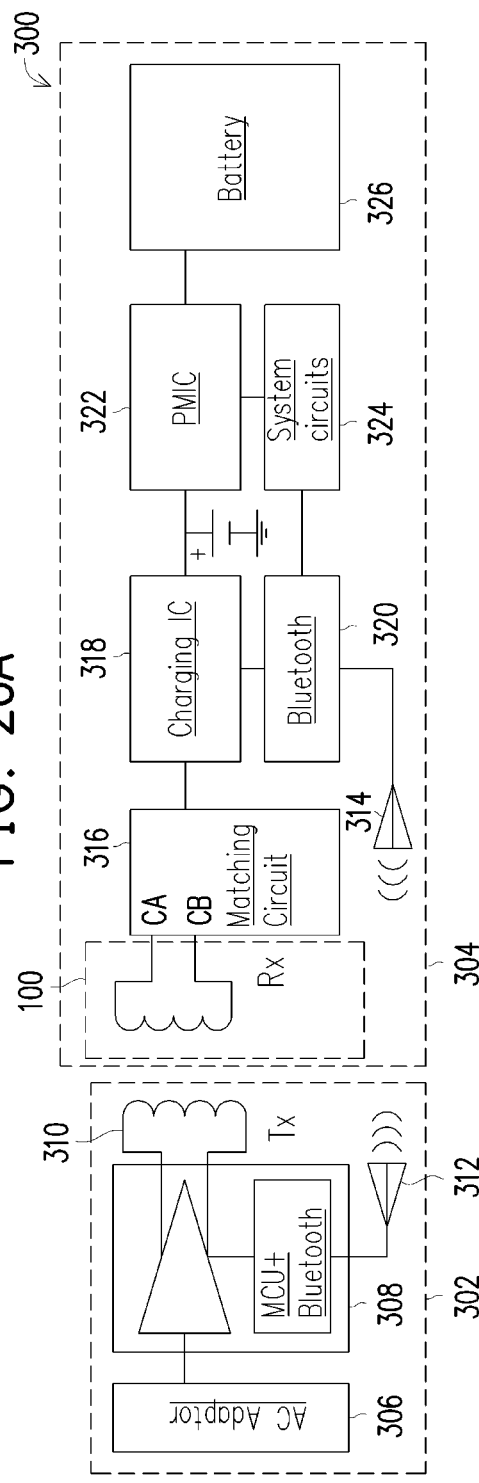
FIG. 20A
FIG. 20B

STACKED COIL FOR WIRELESS CHARGING STRUCTURE ON INFO PACKAGE

PRIORITY CLAIM AND CROSS-REFERENCE

This application is a continuation of U.S. patent application Ser. No. 16/422,430, entitled "Stacked Coil for Wireless Charging Structure on InFO Package," and filed May 24, 2019, which is a continuation of U.S. patent application Ser. No. 16/203,945, entitled "Stacked Coil for Wireless Charging Structure on InFO Package," and filed Nov. 29, 2018, now U.S. Pat. No. 10,304,614 issued May 28, 2019, which is a divisional of U.S. patent application Ser. No. 15/254,761, entitled "Stacked Coil for Wireless Charging Structure on InFO Package," and filed Sep. 1, 2016, now U.S. Pat. No. 10,269,481 issued Apr. 23, 2019, which claims the benefit of U.S. Provisional Application No. 62/342,320, filed May 27, 2016 entitled, "Stacking Coil for Wireless Charging Structure on InFO Package" which applications are hereby incorporated herein by reference.

BACKGROUND

Wireless charging has become an increasingly popular charging technology. Wireless charging is sometimes known as inductive charging, which uses an electromagnetic field to transfer power between a power transmitter and a power receiver. The power is sent through inductive coupling to an electrical device, which can then use that power to charge batteries or run the device. Induction chargers use a first induction coil to create an alternating electromagnetic field from the transmitter and a second induction coil to receive the power from the electromagnetic field. The second induction coil converts the power back into electric current, which is then used to charge a battery or directly drive electrical devices. The two induction coils, when proximal to each other, form an electrical transformer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A through 1D illustrate a top view, a schematic, and cross-sectional views of a coil module in accordance with some embodiments.

FIGS. 2A through 2E illustrate a perspective view, a top view, a schematic, and cross-sectional views of a coil module in accordance with some embodiments.

FIGS. 3A through 3F illustrate a top view, a schematic, and cross-sectional views of a coil module in accordance with some embodiments.

FIGS. 4A through 19B illustrate the cross-sectional views of intermediate stages in the formation of a coil module in accordance with some embodiments.

FIGS. 20A, 20B, and 20C illustrate the circuit diagrams of wireless charging circuits in accordance with some embodiments.

DETAILED DESCRIPTION

Figure 1C:
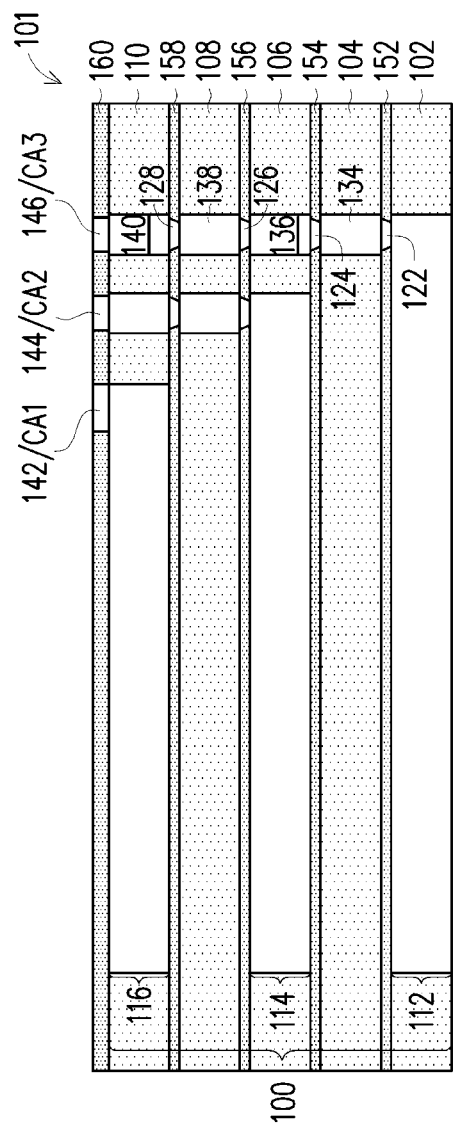

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Coil modules and the methods of forming the same are provided in accordance with various exemplary embodiments. The intermediate stages of forming the coil modules are illustrated in accordance with some embodiments. Some variations of some embodiments are discussed. Throughout the various views and illustrative embodiments, like reference numbers are used to designate like elements.

Figure 1D:
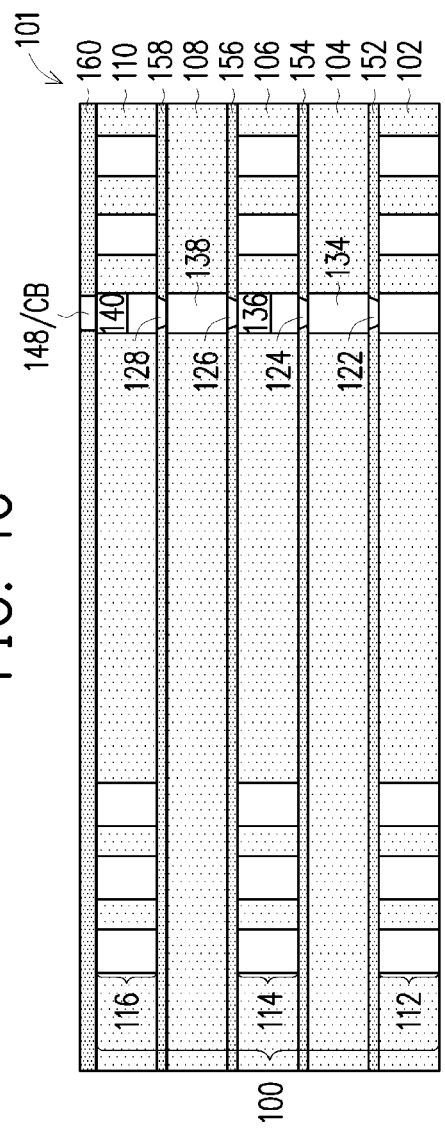

FIG. 1A illustrates a top view of coil module 101, which includes coil 100 built therein. In accordance with some embodiments of the present disclosure. Coil 100 is formed in a plurality of encapsulating layers 102, 104, 106, 108, and 110, as shown in FIGS. 1C and 1D.

Referring to FIG. 1B, which illustrates a schematic of coil 100 in accordance with some embodiments, coil 100 includes coils 112, 114, and 116 connected in parallel. Coils 112, 114, and 116 have terminals CA1, CA2, and CA3, respectively. Furthermore, Coils 112, 114, and 116 have terminals connected together to form common terminal CB. In accordance with some embodiments of the present disclosure, terminal CB is an electrical ground node, which is connected to electrical ground when coil 100 is used to form integrated circuits such as the wireless charging circuits shown in FIGS. 20A, 20B, and 20C.

In accordance with some embodiments of the present disclosure, coils 112, 114, and 116 form spirals, wherein the outer ends are terminals CA1, CA2, and CA3, and the inner ends are connected together to form common terminal CB. In accordance with alternative embodiments (not shown), the outer ends of coils 112, 114, and 116 are interconnected to form common terminal CB, while the inner ends are terminals CA1, CA2, and CA3.

FIG. 1C illustrates a cross-sectional view of coil module 101, wherein the cross-sectional view is obtained from a plane containing line 1C-1C in FIG. 1A. As shown in FIG. 1C, coils 116, 114, and 112 are formed in encapsulating layer 110, 106, and 102, respectively. Each of coils 116, 114, and 112 has a long side in the illustrated plane. Since coils 112 and 114 are formed in lower encapsulating layers, vias 122, 124, 126, and 128 and through-molding vias 134, 136, 138, and 140 (which are also referred to as metal posts) are formed to connect coils 112 and 114 to the top surface of the coil module 101. Electrical connectors 142, 144, and 146 are formed at the top surface of coil module 101, and may act as terminals CA1, CA2, and CA3, respectively. Electrical connectors 142, 144, and 146 may be Under-Bump Metallurgies (UBMs), metal pads, metal pillars, or the like, and may or may not include solder regions.

In accordance with some embodiments, encapsulating layers 102, 104, 106, 108, and 110 are formed of molding compounds, molding underfills, epoxies, resins, or the like. Dielectric layers 152, 154, 156, and 158 are formed to separate the encapsulating layers from each other, wherein vias 122, 124, 126, and 128 are formed in dielectric layers 152, 154, 156, and 158 for electrical interconnection.

FIG. 1D illustrates a cross-sectional view of coil module 101, wherein the cross-sectional view is obtained from a plane containing line 1D-1D in FIG. 1A. The cross-sectional view passes through common terminal CB and some sides of coils 112, 114, and 116. In accordance with some embodiments, electrical connector 148 acts as, or is connected to, the common terminal CB. Furthermore, electrical connector 148 is connected to a plurality of through-molding vias and vias in dielectric layers, which connect coils 112, 114, and 116 to common terminal CB.

FIGS. 2A, 2B, and 2C illustrate a perspective view, a top view, and a schematic of coil module 101 in accordance with some embodiments. Coil 100 in accordance with these embodiments are built similar to coil 100 in FIGS. 1A through 1D, except coils 112, 114, and 116 are connected serially to form coil 100. Referring to FIG. 2A, coil 112, 114, and 116 are formed in encapsulating layers 102, 106, and 110, respectively. The outer end 116A of coil 116 is connected to the outer end 114A of coil 114 through vertical connection line 162A, which includes two vias and a through-molding via. The inner end 114B of coil 114 is connected to inner end 112B of coil 112 through vertical connection line 162B. The outer end of coil 112 is connected to the top of coil module 101 through vertical connection line 162C, which includes a plurality of vias and through-molding vias as shown in FIG. 2D. The inner end 116A is connected to (or act as) terminal CB of coil 100, and the top end of connection line 162C is connected to (or act as) terminal CA of coil 100.

FIG. 2B illustrate a top view of coil module 101, wherein terminals CA and CB are illustrated. Coil 116 overlaps coil 114, which further overlaps coil 112. FIG. 2C illustrates a schematic of coil 100, which includes coils 112, 114, and 116 connected serially with a head-to-end pattern.

FIG. 2D illustrates a cross-sectional view of coil module 101, wherein the cross-sectional view is obtained from a plane containing line 2D-2D in FIG. 2A. The cross-sectional view passes through common terminal CA and some sides of coils 112, 114, and 116. Electrical connections 162A and 162C (also refer to FIG. 2A) are also shown in the illustrated plane.

FIG. 2E illustrates a cross-sectional view of coil module 101, wherein the cross-sectional view is obtained from a plane containing line 2E-2E in FIG. 2A. The cross-sectional view passes through common terminal CB, and is in a direction perpendicular to some sides of coils 112, 114, and 116. Electrical connection 162B (also refer to FIG. 2A) is also shown in the illustrated plane.

Figure 20C:
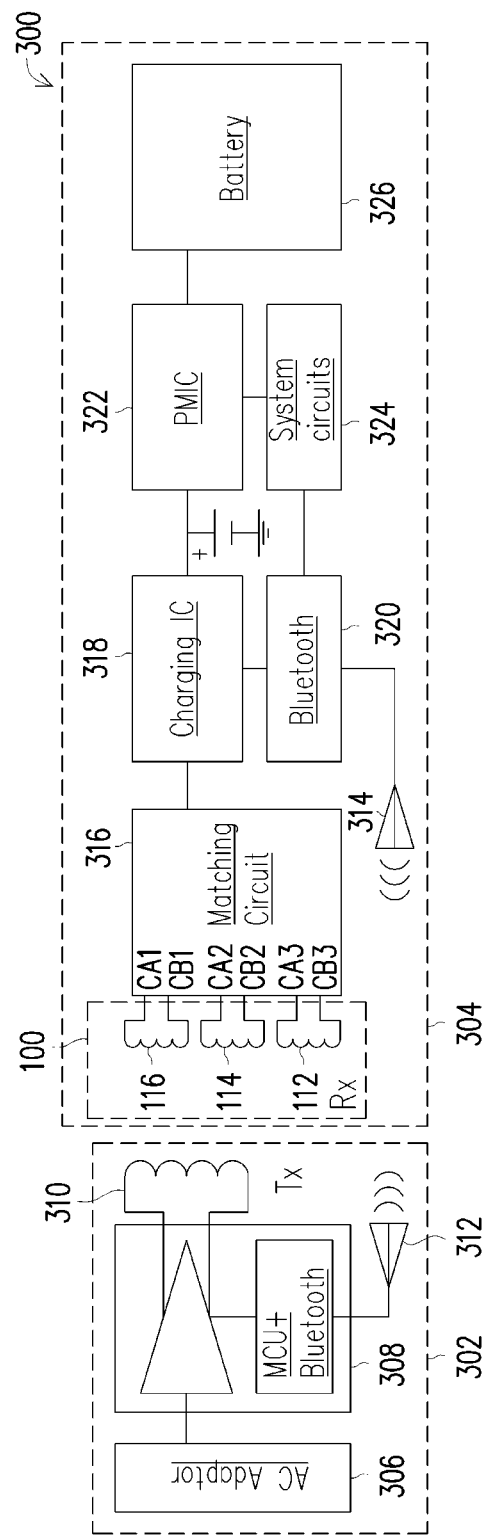

FIGS. 3A, 3B, and FIGS. 3C through 3F illustrate a top view, a schematic, and cross-sectional views of coil module 101 in accordance with some embodiments. Coil 100 in accordance with these embodiments are built similar to coil 100 as shown in FIGS. 1A through 1D, except coils 112, 114, and 116 are disconnected from each other. The integration of coils 112, 114, and 116 are performed by integrated circuits as shown in FIGS. 20A, 20B, and 20C.

Figure 3B:
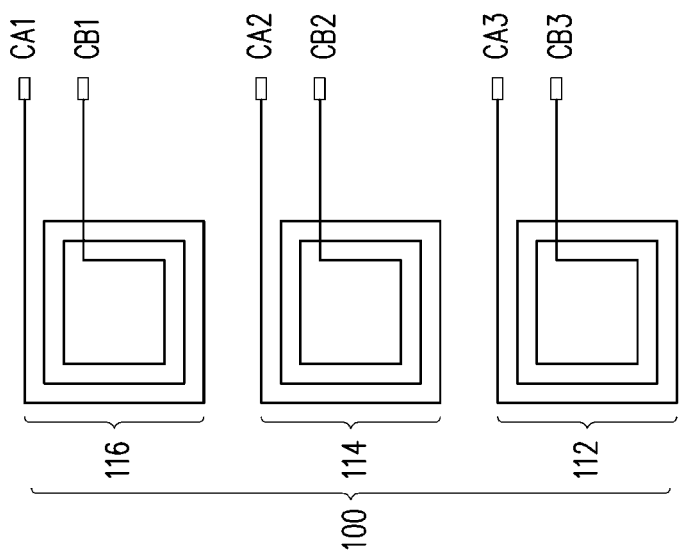
Figure 3A:
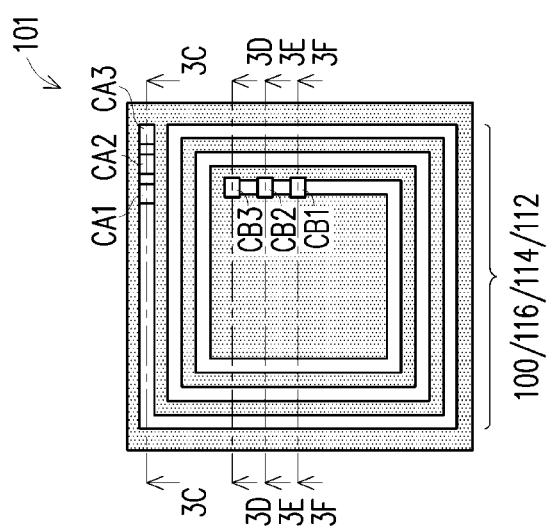

As shown in FIG. 3B, coil 100 includes independent coils 116, 114, and 112 that have no interconnections. Coil 116 has terminals CA1 and CB1. Coil 114 includes terminals CA2 and CB2. Coil 112 includes terminals CA3 and CB3. As shown in FIG. 3A, coil 116 may overlap coil 114, which further overlaps coil 112.

FIG. 3C illustrates a cross-sectional view of coil module 101, wherein the cross-sectional view is obtained from a plane containing line 3C-3C in FIG. 3A. The cross-sectional view passes through terminals CA1, CA2, and CA3, and extends in a direction parallel to (and cuts into) a long side of each of coils 112, 114, and 116. As shown in FIG. 3C, each of coils 112, 114, and 116 is connected to one of terminals CA1, CA2, and CA3 in the illustrated plane.

FIG. 3D illustrates a cross-sectional view of coil module 101, wherein the cross-sectional view is obtained from a plane containing line 3D-3D in FIG. 3A. The cross-sectional view passes through terminal CB3, and is in a direction perpendicular to (and cuts into) the long sides of each of coils 112, 114, and 116. As shown in FIG. 3D, coil 112 is connected to terminals CB3 through a plurality of vias (in dielectric layers) and through-molding vias.

Figure 3E:
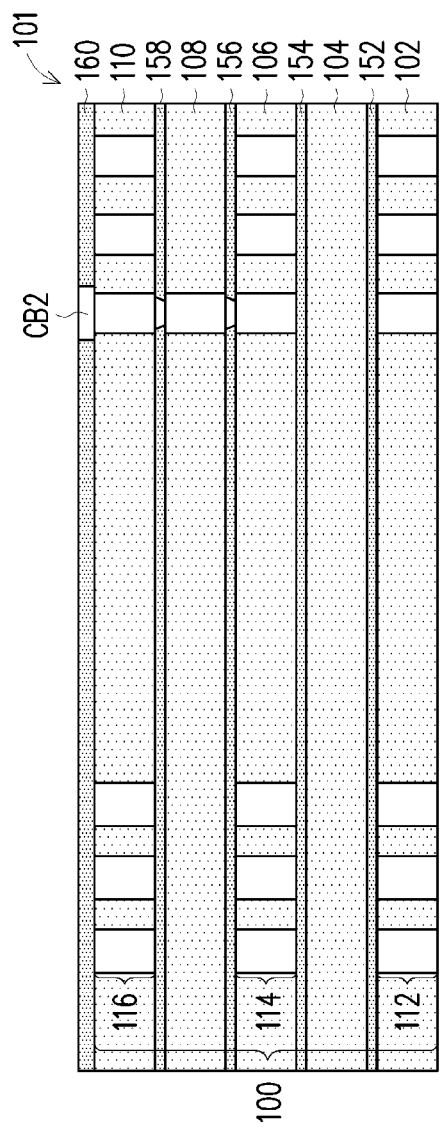

FIG. 3E illustrates a cross-sectional view of coil module 101, wherein the cross-sectional view is obtained from a plane containing line 3E-3E in FIG. 3A. The cross-sectional view passes through terminal CB2, and extends in a direction perpendicular to (and cuts into) the long sides of each of coils 112, 114, and 116. As shown in FIG. 3E, coil 114 is connected to terminals CB2 through a plurality of vias and through-molding vias.

Figure 3F:
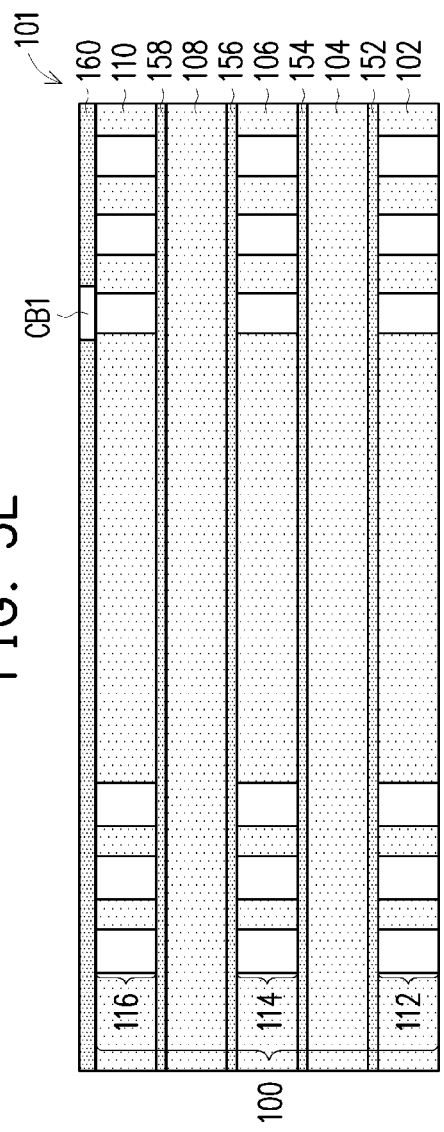

FIG. 3F illustrates a cross-sectional view of coil module 101, wherein the cross-sectional view is obtained from a plane containing line 3F-3F in FIG. 3A. The cross-sectional view passes through terminal CB1, and is in a direction perpendicular to (and cuts into) the long side of each of coils 112, 114, and 116. As shown in FIG. 3F, coil 116 is connected to terminals CB1 through a plurality of vias in dielectric layers and through-molding vias.

Figures 23A, 23B:
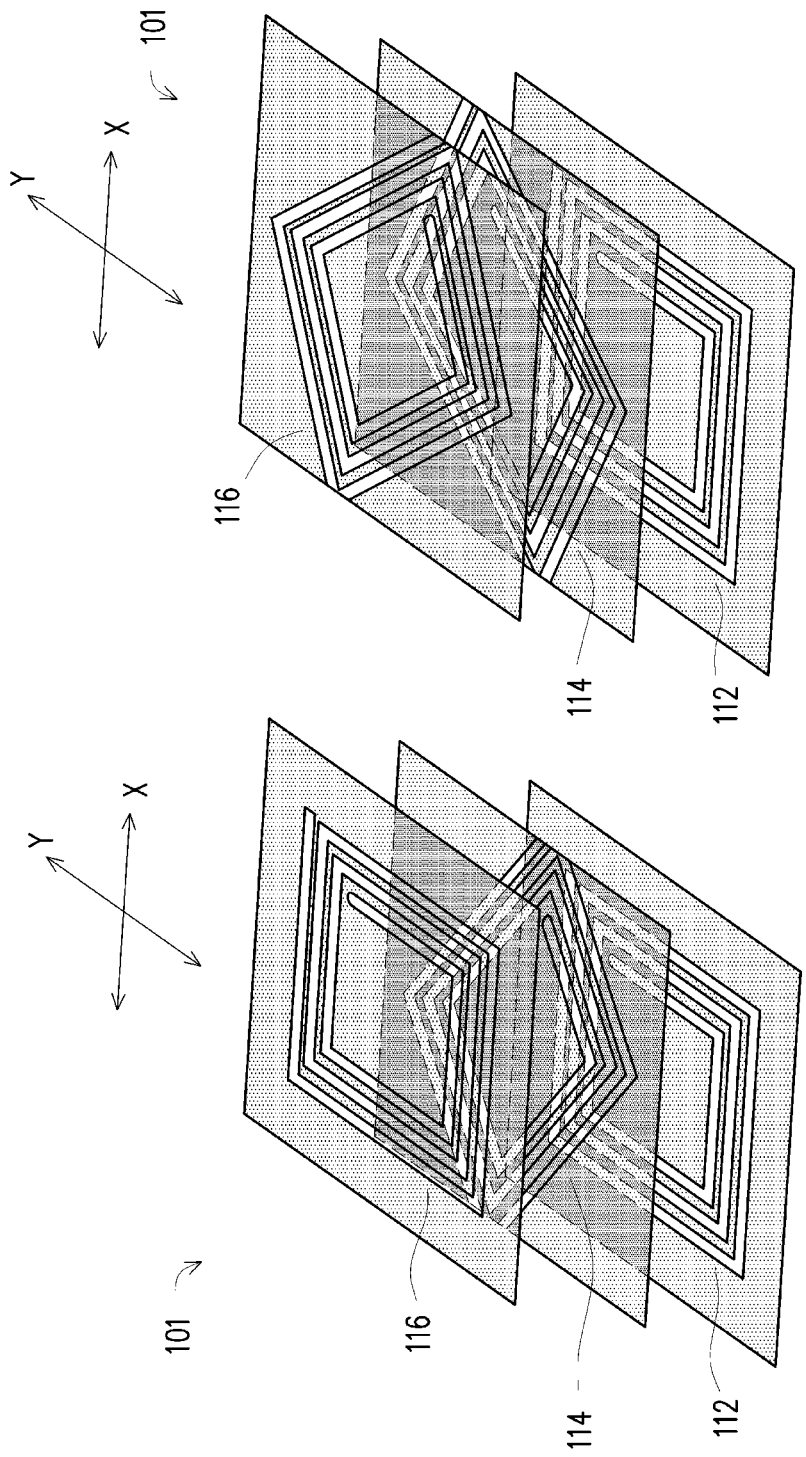
FIGS. 23A and 23B illustrate the perspective views of coil modules in accordance with some embodiments, wherein the coils in different layers of a coil module are rotated relative to each other.

FIGS. 23A and 23B illustrate the perspective view of coil modules 101 in accordance with some embodiments, wherein coils 116 overlaps coils 112 and 114, while at least one of coils 112 and 114 is rotated relative to others. Referring to FIG. 23A, coil module 101 includes coils 112, 114, and 116, wherein coil 114 overlaps coil 112, and coil 116 overlaps coil 114. In accordance with some embodiments, each of coils 112, 114, and 116 has a rectangular shape. The sides (the metal lines) of coils 112 and 116 are parallel to the X direction or Y direction, which are perpendicular to each other. The sides of coil 114, however, are neither parallel to nor perpendicular to, the X direction and Y direction. Accordingly, it can be viewed that the sides of coil 114 is rotated relative to the X direction and the Y direction (and the directions of coils 112 and 116) by an angle between (and not including) 0 degrees and 90 degrees.

FIG. 23B illustrates a perspective view of coil module 101 in accordance with some embodiments. The sides of one of coils 112, 114, and 116 (for example, coil 116 as illustrated) are parallel to the X direction or Y direction, which are perpendicular to each other. Neither one of coils 112 and 114 have sides parallel to or perpendicular to the X direction or the Y direction. Accordingly, each of coils 112, 114, and 116 is rotated relative to other coils in coils 112, 114, and 116 by an angle between (and not including) 0 degrees and 90 degrees.

The connections of coils 112, 114, and 116 are not shown in FIGS. 23A and 23B. The connections of coils 112, 114, and 116 in each of FIGS. 23A and 23B may be any one shown in FIGS. 1B, 2C, and 3B.

FIG. 20A illustrates the circuit diagram of an exemplary wireless charging circuit 300 including the coil 100 as shown in FIGS. 1A through 1D and FIGS. 23A and 23B in accordance with some embodiments. Wireless charging circuit 300 includes power-transmitting circuit 302 for transmitting power, and power-receiving circuit 304 for receiving power. Power-transmitting circuit 302 includes AC adapter 306, Micro-Control Unit (MCU) and Bluetooth circuit 308, power-transmitting (TX) coil 310, and Bluetooth signal antenna 312. Power-receiving circuit 304 includes Bluetooth signal antenna 314, power-receiving coil 100, matching circuit 316, charging Integrated Circuit (IC) 318, Bluetooth die 320, Power Management Integrated Circuit (PMIC) 322, System Circuits 324, and battery 326. It is appreciated that the illustrated wireless charging circuits are examples, and all other wireless charging circuits having different design are within the scope of the present disclosure.

In accordance with some exemplary embodiments, Ac adapter 306 provides power to power-transmitting (TX) coil 310. MCU and Bluetooth circuit 308 may negotiate with Bluetooth circuit 320, for example, to determine the power and the timing of the power transmission, Bluetooth signals for the negotiation are sent and received through antennas 312 and 314. For example, through the negotiation, wireless power may be sent when the distance between power-transmitting circuit 302 and power-receiving circuit 304 is small enough, and/or when the stored power in battery 326 is lower than a pre-determined threshold level.

When it is determined that power should be transmitted, power-transmitting circuit 302 starts transmitting power, which may be in the form of magnetic field at a high frequency, for example, at about 6.78 MHz. The power is transmitted through coil 310. Coil 100 receives the power, and feed the respective current to charging IC 318, which includes an AC-DC converter. PMIC 322 may have the function of DC to DC conversion, battery charging, linear regulation, power sequencing and other miscellaneous system power functions. System circuits 324 handle logic functions. The converted power is charged to battery 326.

As shown in FIG. 20A, coil 100 may have the structure as shown in FIGS. 1A through 1D, which includes four terminals CA1, CA2, CA3, and common terminal CB, which are connected to matching circuit 316 in accordance with some embodiments. The power provided by coils 112, 114, and 116 are combined by matching circuit 316 and charging IC 318. Accordingly, coils 112, 114, and 116 act like a single coil.

FIG. 20B illustrates the circuit diagram of an exemplary wireless charging circuit 300 using the coil 100 as shown in FIGS. 2A through 2E in accordance with some embodiments. The coil 100 as shown in FIG. 20B includes the serially connected coils 112, 114, and 116 as shown in FIG. 2C. The function of coil 100 is similar to what is shown in FIG. 20A, and hence are not repeated herein.

FIG. 20C illustrates the circuit diagram of an exemplary wireless charging circuit 300 using the coil 100 as shown in FIGS. 3A through 3F in accordance with some embodiments. The coil 100 as shown in FIG. 20C includes the three discrete coils 112, 114, and 116 as shown in FIG. 3B. The function of coil 100 is similar to what is shown in FIG. 20A, and hence are not repeated herein. The power received by the discrete coils 112, 114, and 116 are combined by matching circuit 316 and/or charging IC 318. Accordingly, coils 112, 114, and 116 act like a single coil.

FIGS. 4A through 19B illustrate the cross-sectional view of intermediate stages in the formation of coil module 101 in accordance with some exemplary embodiments. The respective formation steps are also illustrated in the process flow 200 as show in FIG. 22. The example formation process illustrated in FIGS. 4A through 19B use the embodiments in FIGS. 1A through 1D as an example to explain the formation process. The embodiments shown in FIGS. 2A through 2E and FIGS. 3A through 3F may be formed using essentially the same processes except the layouts of coils 100 in these embodiments are changed. In each illustrated step, two cross-sectional views are shown, wherein the cross-sectional view having the figure number including letter "A" following a digit(s) is obtained from the same vertical plane of line 1C-1C in FIG. 1A, and the cross-sectional view having the figure number including letter "B" following a digit(s) is obtained from the same vertical plane containing line 1D-1D in FIG. 1A.

FIGS. 4A and 4B illustrate carrier 20 and dielectric layer 22 formed over carrier 20. Carrier 20 may be a glass carrier, a ceramic carrier, or the like. Carrier 20 may have a round top-view shape, and may have a size of a silicon wafer. There may be a release layer (not shown) over carrier 20, wherein the release layer may be formed of Light To Heat Conversion (LTHC) coating. The LTHC coating may be removed along with carrier 20 from the overlying structures that will be formed in subsequent steps.

In accordance with some embodiments of the present disclosure, dielectric layer 22 is formed over the release layer. The respective step is shown as step 202 in the process flow shown in FIG. 22. In the final product, dielectric layer 22 may be used as a passivation layer to isolate the overlying metallic features from the adverse effect of moisture and other detrimental substances. Dielectric layer 22 may be formed of a polymer, which may also be a photo-sensitive material such as polybenzoxazole (PBO), polyimide, benzocyclobutene (BCB), or the like. In accordance with alternative embodiments of the present disclosure, dielectric layer 22 is formed of an inorganic material(s), which may be a nitride such as silicon nitride, an oxide such as silicon oxide, PhosphoSilicate Glass (PSG), BoroSilicate Glass (BSG), Boron-doped PhosphoSilicate Glass (BPSG), or the like.

Seed layer 24 is formed over dielectric layer 22, for example, through Physical Vapor Deposition (PVD). Seed layer 24 may be formed of copper, aluminum, titanium, or multi-layers thereof. In accordance with some embodiments of the present disclosure, seed layer 24 includes a titanium layer (not separately shown) and a copper layer (not separately shown) over the titanium layer. In accordance with alternative embodiments, seed layer 24 includes a single copper layer. Photo resist 26 is formed over seed layer 24, and is patterned to from openings 28. The respective step is shown as step 204 in the process flow shown in FIG. 22. In a top view of FIGS. 4A and 4B, openings 28 forms a spiral.

FIGS. 5A and 5B illustrate the formation of coil 112, which includes plating a metallic material in openings 28 (FIGS. 4A and 4B) and over seed layer 24. The respective step is shown as step 206 in the process flow shown in FIG. 22. Coil 112 may include copper, aluminum, tungsten, nickel, or alloys thereof. After the plating of coil 112, photo resist 26 is removed, and the resulting structure is shown in FIGS. 5A and 5B. The portions of seed layer 24 (FIG. 2) that were previously covered by photo resist 26 are exposed. An etch step is then performed to remove the exposed portions of seed layer 24, wherein the etching may be an anisotropic or isotropic etching. The portions of seed layer 24 that are overlapped by coil 112, on the other hand, are not etched. Throughout the description, the remaining underlying portions of seed layer 24 are considered as being the bottom portions of coil 112. When seed layer 24 is formed of a material similar to or the same as that of the respective overlying coil 112, seed layer 24 may be merged with coil 112 with no distinguishable interface therebetween. Accordingly, seed layers 24 are not shown in subsequent drawings. In accordance with alternative embodiments of the present disclosure, there exist distinguishable interfaces between seed layer 24 and the overlying plated portions of coil 112.

Figure 6A:
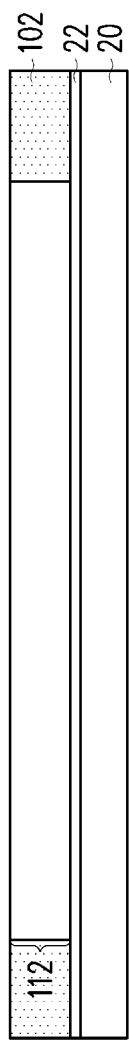
Figure 6B:
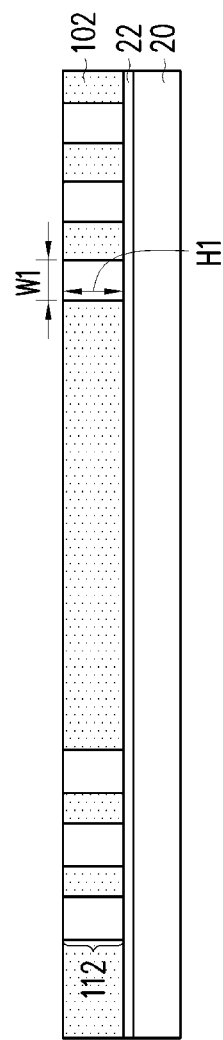

Next, referring to FIGS. 6A and 6B, encapsulating material (layer) 102 is encapsulated (sometimes referred to as molded) on coil 112. The respective step is shown as step 208 in the process flow shown in FIG. 22. Encapsulating material 102 fills the gaps between neighboring portions of coil 112. Encapsulating material 102 may include a polymer-based material, and may include a molding compound, a molding underfill, an epoxy, and/or a resin. The top surface of encapsulating material 102 is higher than the top ends of coil 112. Encapsulating material 102 may include an epoxy-based material and fillers in the epoxy-based material. The fillers may be spherical particles having the same diameter or different diameters. The fillers may be formed of silica (amorphous $SiO_2$), dry-ground micritic limestone, for example.

In a subsequent step, a planarization process such as a Chemical Mechanical Polish (CMP) process or a mechanical grinding process is performed to reduce the top surface of encapsulating material 102, until coil 112 is exposed. The respective step is also shown as step 208 in the process flow shown in FIG. 22. Due to the planarization, the top ends of coil 112 are substantially level (coplanar) with the top surfaces of encapsulating material 102. In accordance with some embodiments, after the planarization, height H1 (FIG. 6B) of coil 112 is in the range between about 100 μm and about 150 μm, and width W1 of coil 112 is in the range between about 100 μm and about 400 μm. The ratio of width W1/H1 may be in the range between about ⅔ and about 4.0.

FIGS. 7A and 7B illustrate the formation of dielectric layer 152 and vias 122 in dielectric layer 152 in accordance with some exemplary embodiments. The respective step is shown as step 210 in the process flow shown in FIG. 22. In accordance with alternative embodiments, vias 122, rather than being formed before the formation of through-molding vias 134 (FIGS. 9A and 9B), are formed in the same process as through-molding vias 134. In accordance with some embodiments of the present disclosure, dielectric layer 152 comprises an organic dielectric material, which may be a polymer such as PBO, polyimide, BCB, or the like. In accordance with alternative embodiments, dielectric layer 152 is formed of an inorganic dielectric material such as silicon oxide, silicon nitride, silicon carbide, or the like. Vias 122 are formed in dielectric layer 152, for example, wherein the formation process may include forming openings in dielectric layer 152 to expose coil 112, and then plating a metal in the openings. Vias 122 may be formed of copper, aluminum, silver, nickel, tungsten, or alloys thereof.

Figure 8A:
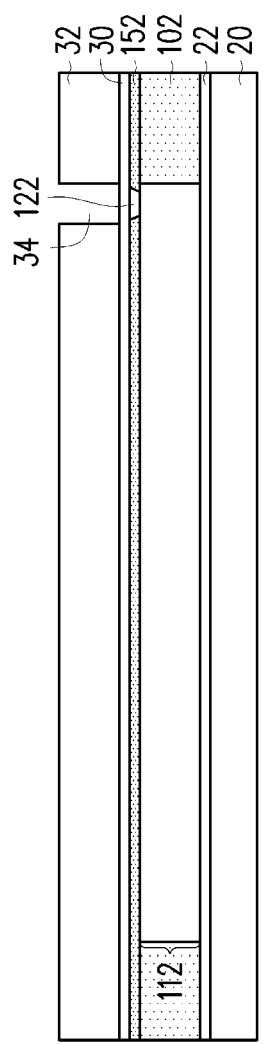
Figure 8B:
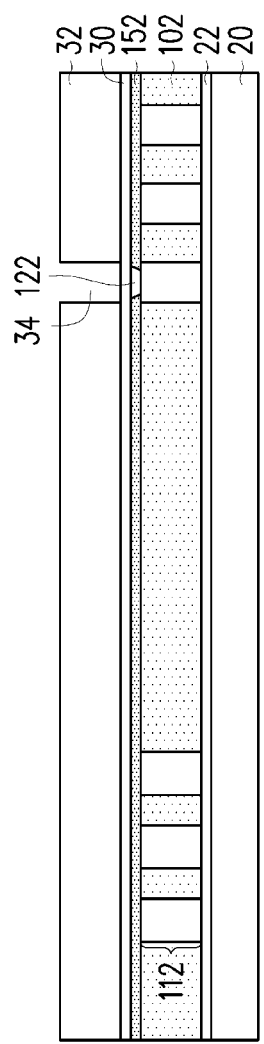
Figure 9A:
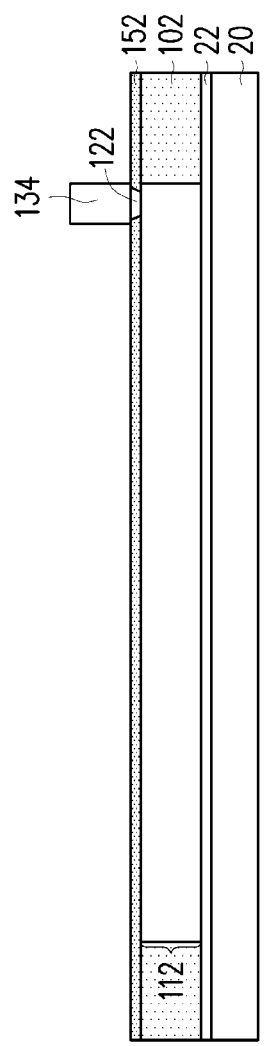
Figure 9B:
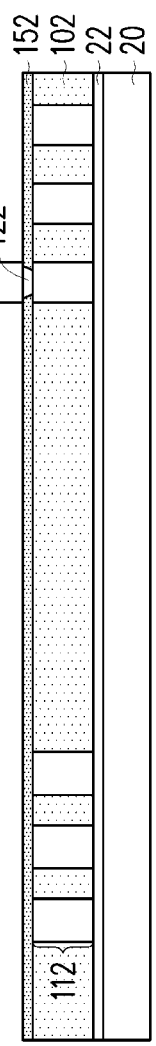

FIGS. 8A through 9B illustrate the formation of separation dielectric layers and the through-molding vias therein. Referring to FIGS. 8A and 8B, seed layer 30 is formed over dielectric layer 152 and vias 122. Seed layer 30 may be formed of a material similar to the material of seed layer 24 (FIGS. 4A and 4B), and may be formed using PVD, for example. Photo resist 32 is formed over seed layer 30, and is then patterned to form openings 34. The respective step is shown as step 212 in the process flow shown in FIG. 22. Next, a plating process is performed to plate through-molding vias 134, followed by removing photo resist 32, and etching the exposed portions of seed layer 30. The respective step is shown as step 214 in the process flow shown in FIG. 22. The resulting structure is shown in FIGS. 9A and 9B.

In accordance with alternative embodiments of the present disclosure, vias 122 and through-molding vias 134 are formed in a same process, which includes forming openings in dielectric layer 152, forming a seed layer having a portion over dielectric layer 152 and portions extending into the openings, forming and patterning photo resist 32, plating to form vias 122 and through-molding vias 134, removing photo resist 32, and etching the seed layer.

Figure 22:
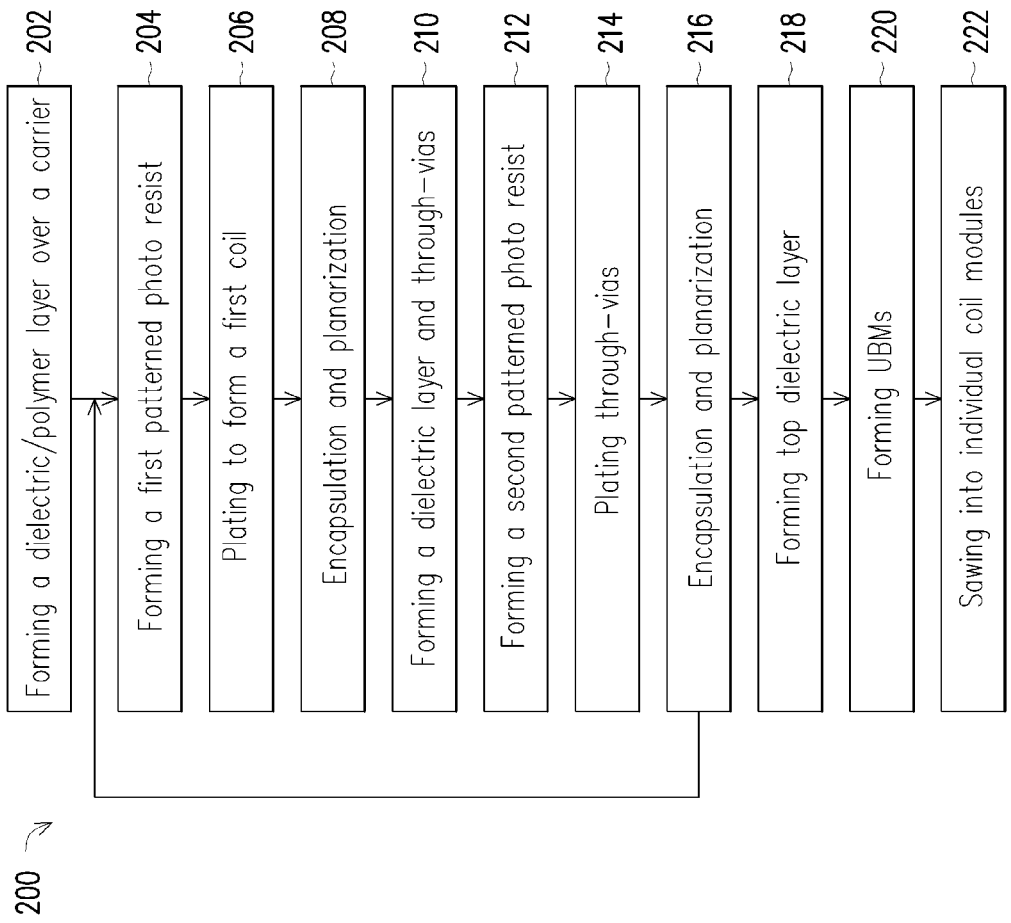
FIG. 22 illustrates a process flow for forming a coil module in accordance with some embodiments.

In subsequent steps, the process steps as shown in the process flow in FIG. 22 may be repeated to form overlying structures, wherein some of steps 204, 206, 208, 210, 212, 214, and 216 may be repeated. FIGS. 10A and 10B illustrate the encapsulation of through-molding vias 134 in encapsulating material 104, and the planarization of encapsulating material 104 and through-molding vias 134. The respective step is shown as step 216 in the process flow shown in FIG. 22. The material and the formation method of encapsulating material 104 are similar to that of encapsulating material 102. Encapsulating material 104 has the function of enlarging the distance between coils 112 and the overlying coil 114 great enough in order to reduce the interference between coils 112 and 114.

FIGS. 11A and 11B illustrate the formation of dielectric layer 154 and vias 124 in dielectric layer 154 in accordance with some exemplary embodiments. The formation processes and the materials of dielectric layer 154 and vias 124 may be selected from the same candidate formation methods and same materials of dielectric layer 152 and vias 122, respectively, and the details are not repeated herein.

The subsequent process steps as shown in FIGS. 12A through 18B may adopt the similar methods and materials for forming coils, vias, through-molding vias, dialectic layers, and encapsulating materials as the similar underlying features shown in FIGS. 4A through 10B. The details of the methods and materials may be found referring to the discussion of FIGS. 4A through 10B, and may not be repeated.

Figure 13A:
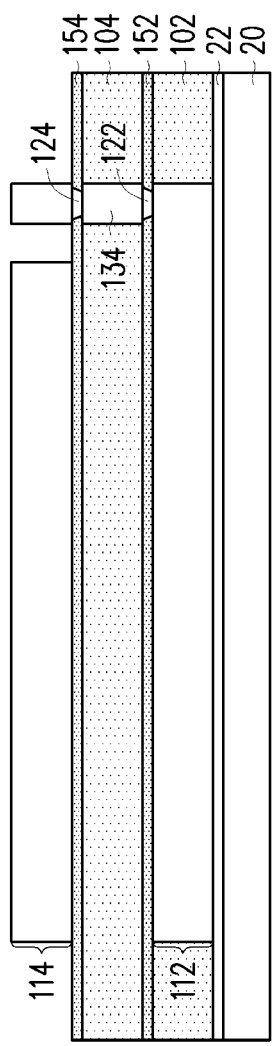
Figure 13B:
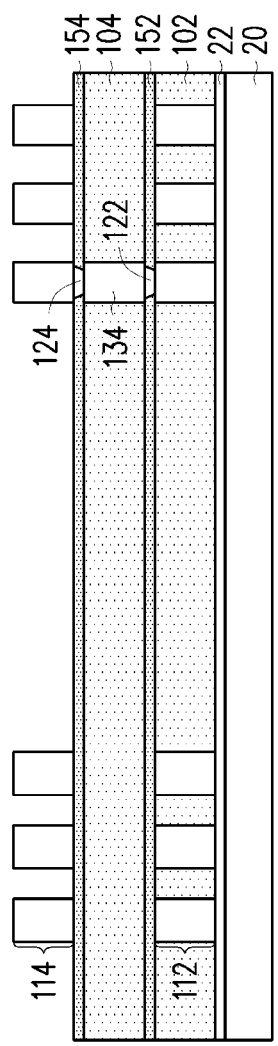
Figure 14A:
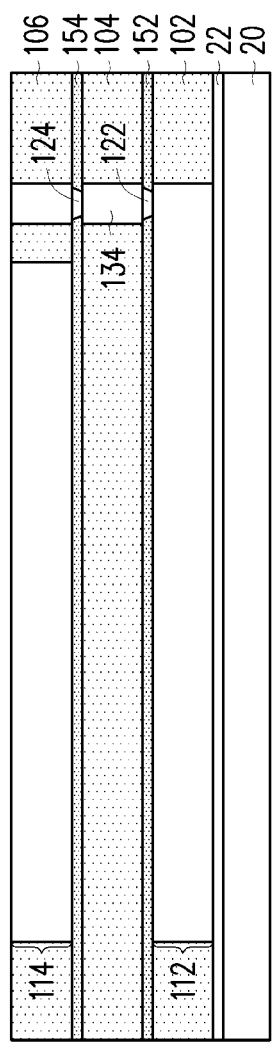
Figure 14B:
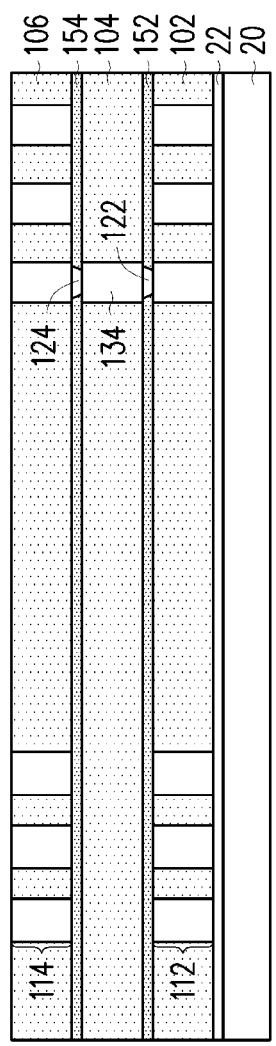
Figure 16A:
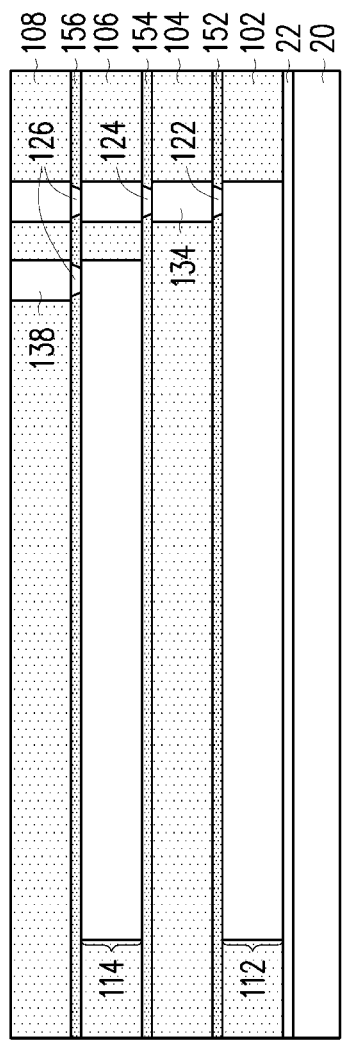
Figure 16B:
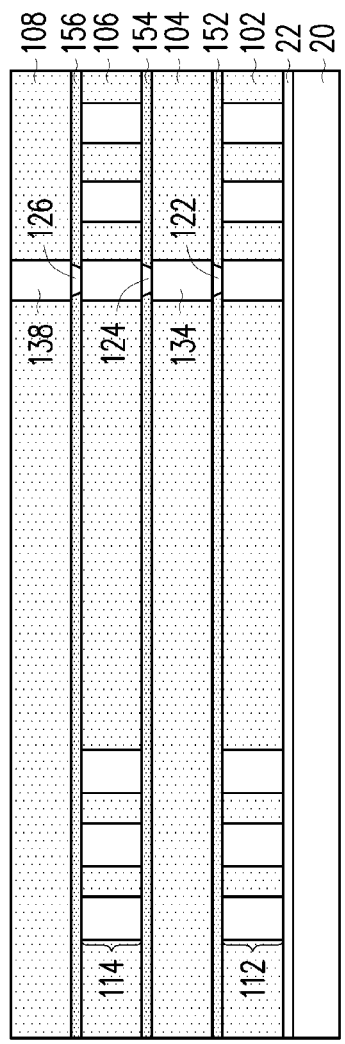

As shown in FIGS. 12A through 13B, coil 114 is formed. Referring to FIGS. 12A and 12B, Seed layer 36 is formed. Photo resist 38 is applied over seed layer 36, and is then patterned, forming openings 40 therein. Referring to FIGS. 13A and 13B, coil 114 is formed, which is then encapsulated in encapsulating material 106 as shown in FIGS. 14A and 14B. FIGS. 15A and 15B illustrate the formation of dielectric layer 156, vias 126 in dielectric layer 156, and through-molding vias 138. Through-molding vias 138 are then encapsulated in encapsulating material 108, followed by a planarization, as shown in FIGS. 16A and 16B. FIGS. 17A and 17B illustrate the formation of coil 116.

Figure 19A:
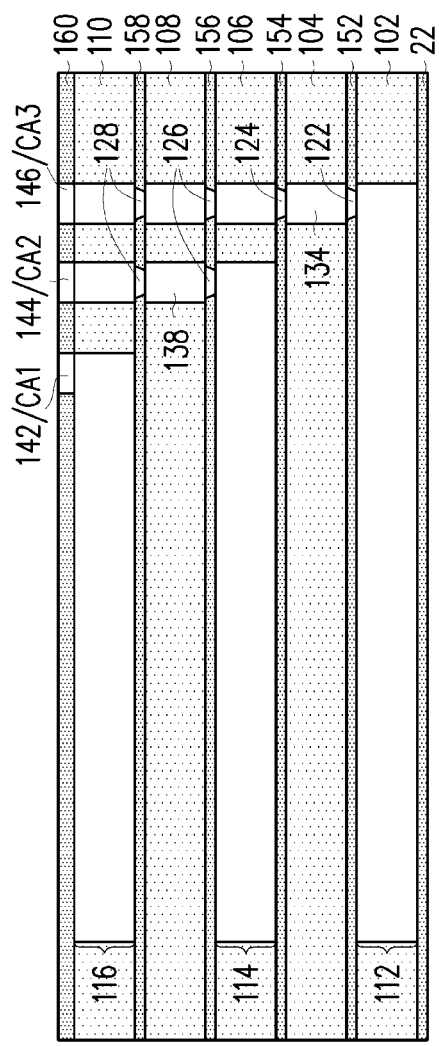
Figure 19B:
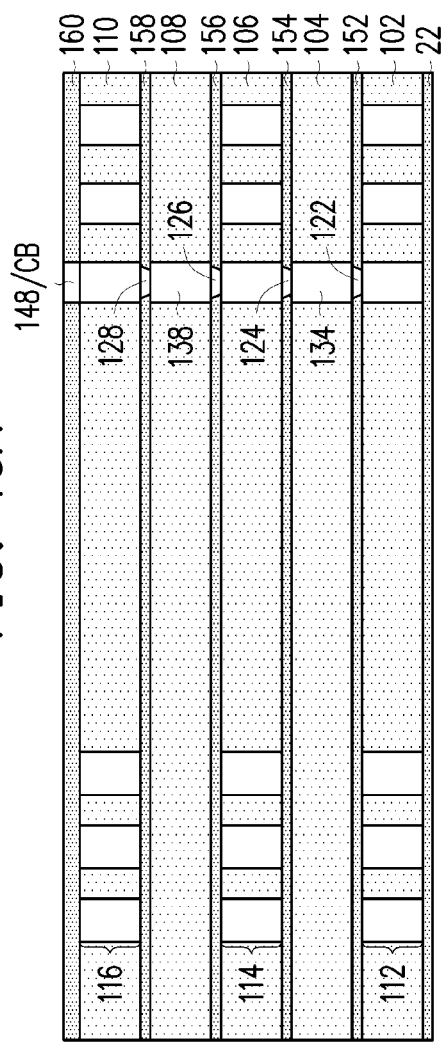

Next, as shown in FIGS. 18A and 18B, coil 116 is encapsulated in encapsulating material 110, followed by a planarization to expose coil 116. Dielectric layer 160 is then formed over coil 116 and encapsulating material 110. The respective step is shown as step 218 in the process flow shown in FIG. 22. Electrical connectors 142, 144, and 146 are then formed, and act as terminals CA1, CA2, and CA3 of the respective coils 116, 114, and 112, respectively. The respective step is shown as step 220 in the process flow shown in FIG. 22. In the meanwhile, electrical connector 148 is formed and acts as terminal CB. In a subsequent step, the structure over carrier 20 is de-bonded from carrier 20, and the resulting structure is shown in FIGS. 19A and 19B, respectively. It is appreciated that although FIGS. 1C, 1D, 2D, 2E, and 3C-3F do not show layer 22, there may be layer 22 underneath coil 112 in accordance with some embodiments.

When the illustrated coil 100 in FIGS. 19A and 19B is formed, a plurality of coils 100 is formed simultaneously. After the formation of the structure as shown in FIGS. 19A and 19B, a die-saw is performed to separate the structure in FIGS. 19A and 19B into a plurality of discrete coil modules 101, each having the structure shown in FIGS. 1A through 1D, 2A through 2E, or 3A through 3F. The respective step is shown as step 222 in the process flow shown in FIG. 22. Referring to FIG. 1A, in the resulting coil module 101, length L1 of coil 100 may be in the range between about 50% and about 99% of length L2 of coil module 101. Width W2 of coil 100 may be in the range between about 50% and about 99% of width W3 of coil modules 101. The shortest length L3 of coil 100 is about 30% to about 70% of length L2. The occupied area of coil 100 (including the central area surrounded by coil 33) may be between about 25% and about 98% of the top-view area of coil modules 101. The dimensions and areas of the embodiments shown in FIGS. 2B and 3A may be similar to what are shown in FIG. 1A. In accordance with some embodiments, coil module 101 is a discrete module, wherein there are no active devices (such as transistors and diodes) and additional passive devices (such as resistors, capacitors, transmitters, etc.) in addition to coil 100.

Figure 21:
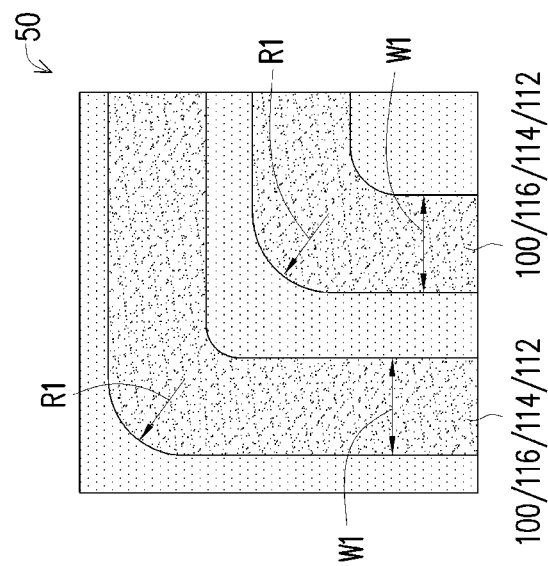
FIG. 21 illustrates an amplified view of a portion of a coil in accordance with some embodiments.

FIG. 21 illustrates an amplified view of portion 50 of coil 100 in FIG. 1A, wherein two corner portions of coils 112, 114, and 116 are illustrated as an example. To reduce stress, coils 112, 114, and 116 may have rounded corners. For example, the radius R1 of coils 112, 114, and 116 may be in the range between about W1/2 and 2W1/3.

To enhance the efficiency, the outer portions of coil 100 may have widths greater than or equal to the width of the widths of the inner portions in accordance with some embodiments. For example, referring to FIG. 1A, width W1A, which may be the width of the outmost coil portion, may be equal to or greater than width W1B of the innermost coil portion. Ratio W1B/W1A may be in the range between about ½ and about ⅔. Furthermore, from outer portions to the inner portions, the widths of coil 100 may be increasingly reduced or periodically reduced every several turns of spirals. FIGS. 2B and 3A, although not shown, may also have rounded corners and changed widths.

The embodiments of the present disclosure have some advantageous features. By forming coils in encapsulating materials, the thickness of each of the coil may be great enough, and hence power dissipation is reduced. By forming multiple coils in multiple layers of encapsulating materials and connecting the coils, the electrical coupling is improved. In addition, the footage of the coils is small due to the stacking of coils.

In accordance with some embodiments of the present disclosure, a structure includes a first encapsulating layer, and a first coil in the first encapsulating layer. A top surface of the first encapsulating layer is coplanar with a top surface of the first coil, and a bottom surface of the first encapsulating layer is coplanar with a bottom surface of the first coil. A second encapsulating layer is over the first encapsulating layer. A conductive via is in the second encapsulating layer, and the first conductive via is electrically coupled to the first coil. A third encapsulating layer is over the second encapsulating layer. A second coil is in the third encapsulating layer. A top surface of the third encapsulating layer is coplanar with a top surface of the second coil, and a bottom surface of the third encapsulating layer is coplanar with a bottom surface of the second coil.

In accordance with some embodiments of the present disclosure, a structure includes a first molding compound, a second molding compound over the first molding compound, a third molding compound over the second molding compound, a fourth molding compound over the third molding compound, and a fifth molding compound over the fourth molding compound. A first coil is in the first molding compound. A second coil is in the third molding compound. A third coil is in the fifth molding compound, and no coil is formed in the second molding compound and the fourth molding compound.

In accordance with some embodiments of the present disclosure, a method includes forming a first coil over a carrier, encapsulating the first coil in a first encapsulating layer, forming a first dielectric layer over the first coil and the first encapsulating layer, forming a metal post over the first dielectric layer, encapsulating the first metal post in a second encapsulating layer, forming a second dielectric layer over the first metal post and the second encapsulating layer, forming a second coil over the second dielectric layer, encapsulating the second coil in a third encapsulating layer, and forming electrical connectors connecting to the first coil and the second coil.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A structure comprising:
    a coil module comprising:
        a plurality of dielectric layers;
        a plurality of coils, each in one of the plurality of dielectric layers, wherein an upper coil in the plurality of coils overlaps a corresponding lower coil in the plurality of coils;
        a first plurality of molding compound layers separating the plurality of coils from each other, wherein each of the first plurality of molding compound layers comprises a base material and filler particles mixed in the based material;
        a top dielectric layer over the plurality of dielectric layers; and a plurality of electrical connectors extending into the top dielectric layer, wherein the plurality of electrical connectors are electrically connected to the plurality of coils.

2. The structure of claim 1 further comprising a power receiving circuit connected to the coil module, wherein the power receiving circuit is configured to receive power from the coil module.

3. The structure of claim 2, wherein the power receiving circuit comprises a power management integrated circuit.

4. The structure of claim 1 further comprising:
a first via in a molding compound layer in the first plurality of molding compound layers, wherein the first via electrically interconnects neighboring coils in the plurality of coils.

5. The structure of claim 4 further comprising:
a first polymer layer overlying and contacting the molding compound layer;
a second polymer layer underlying and contacting the molding compound layer; and
a second via and a third via in the first polymer layer and the second polymer layer respectively, wherein the first via, the second via, and the third via in combination interconnects the neighboring coils.

6. The structure of claim 1, wherein the plurality of coils are connected in series.

7. The structure of claim 1, wherein the plurality of coils are connected in parallel.

8. The structure of claim 1 further comprising a second plurality of molding compound layers, wherein each of the plurality of coils is in one of the second plurality of molding compound layers.

9. A structure comprising:
a plurality of molding compound layers;
a plurality of polymer layers, wherein the plurality of molding compound layers and the plurality of polymer layers form a stack, and the plurality of molding compound layers and the plurality of polymer layers are arranged alternatingly in the stack;
a plurality of coils in the plurality of molding compound layers, wherein each of the plurality of coils has a first top surface coplanar with a second top surface of one of the plurality of molding compound layers, and a first bottom surface coplanar with a second bottom surface of the one of the plurality of molding compound layers; and
a plurality of vias in the plurality of molding compound layers and the plurality of polymer layers, wherein the plurality of vias are electrically connected to the plurality of coils.

10. The structure of claim 9, wherein the plurality of molding compound layers comprise a first sub-set of molding compound layers and a second sub-set of molding compound layers arranged alternatingly in the stack, and wherein the plurality of coils are in the first sub-set, and some of the plurality of vias are in the second sub-set.

11. The structure of claim 9, wherein the plurality of polymer layers are formed of a material selected from the group consisting of polybenzoxazole (PBO), polyimide, and benzocyclobutene (BCB).

12. The structure of claim 9, wherein each of the plurality of molding compound layers comprises an epoxy-based material, and filler particles in the epoxy-based material.

13. The structure of claim 9, wherein two neighboring coils in the plurality of coils are separated from each other by two of the polymer layers and one of the plurality of molding compound layers.

14. The structure of claim 13 further comprising a first via, a second via, and a third via in the two of the polymer layers and the one of the plurality of molding compound layers, wherein the first via, a second via, and a third via are connected in series.

15. The structure of claim 13, wherein the two of the polymer layers contact opposing surfaces of the one of the plurality of molding compound layers.

16. A structure comprising:
a power receiving circuit comprising:
a circuit selected from the group consisting of a matching circuit, a charging circuit, a power management circuit, a battery, and combinations thereof; and
a coil module comprising:
a plurality of molding compound layers, wherein each of the plurality of molding compound layers comprises a base material, and filler particles in the base material; and
a plurality of coils, wherein each of the plurality of coils is in one of the plurality of molding compound layers, and wherein the plurality of coils are electrically connected to the power receiving circuit.

17. The structure of claim 16 further comprising:
a plurality of polymer layers between the plurality of molding compound layers; and
a plurality of vias in the plurality of polymer layers, wherein the plurality of vias interconnect the plurality of coils.

18. The structure of claim 17, wherein the base material is an epoxy-based material, and the plurality of polymer layers comprise a material selected from the group consisting of polybenzoxazole (PBO), polyimide, and benzocyclobutene (BCB).

19. The structure of claim 16, wherein upper coils in the plurality of coils overlap lower coils in the plurality of coils.

20. The structure of claim 16, wherein an upper coil in the plurality of coils is rotated with respective to a lower coil in the plurality of coils, and wherein a first lengthwise direction of a side of one of the upper coil is neither perpendicular to nor parallel to a second lengthwise direction of a second side of the lower coil.

* * * * *